Nov. 29, 1949     M. P. JANISCH     2,489,710

MINNOW PAIL

Filed Feb. 13, 1946

Maximillian P. Janisch
INVENTOR.

BY *Ralph W. Brown*
ATTORNEY.

Patented Nov. 29, 1949

2,489,710

UNITED STATES PATENT OFFICE 2,489,710

MINNOW PAIL

Maximillian P. Janisch, Milwaukee, Wis.; Bride Janisch and Myra J. Hess, executrices of said Maximillian P. Janisch, deceased Application February 13, 1946, Serial No. 647,383

1 Claim. (Cl. 43—56)

This invention relates to minnow pails.

In my copending application Serial No. 582,205, filed March 12, 1945, of which this application is a continuation in part, I have disclosed an improved minnow pail equipped with water aerating means for preserving and prolonging the life of the minnows and wherein the several parts are arranged to facilitate withdrawal of the minnows as desired.

One object of the present invention is to further improve the construction, effectiveness and utility of minnow pails of the kind therein disclosed.

Other objects are to insure the effectiveness of the aerator by limiting the water level in the pail; to protect the contents of the pail against external heat; and to insure against escape of the minnows when the pail is submerged.

Other more specific objects and advantages will appear, expressed or implied, from the following description of an illustrative embodiment of the present invention.

In the accompanying drawings—

Figure 1:
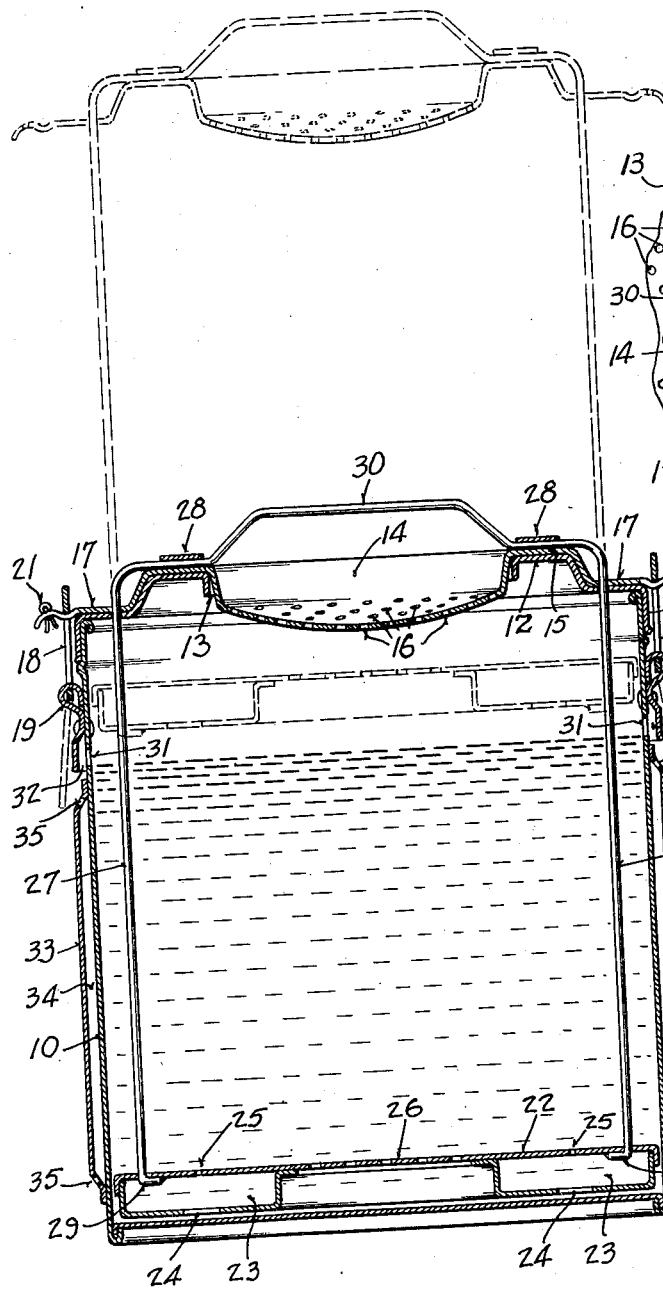
Figure 1 is a vertical sectional view of a minnow pail constructed in accordance with the present invention.
Figure 2:
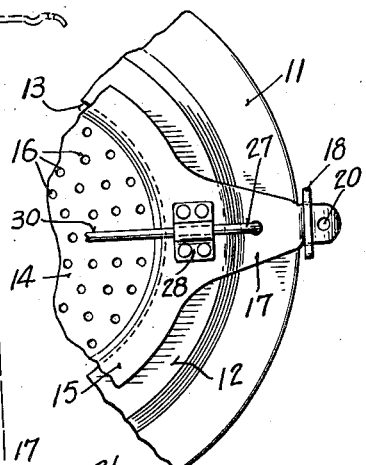
Fig. 2 is fragmentary top plan view thereof.
Figure 3:
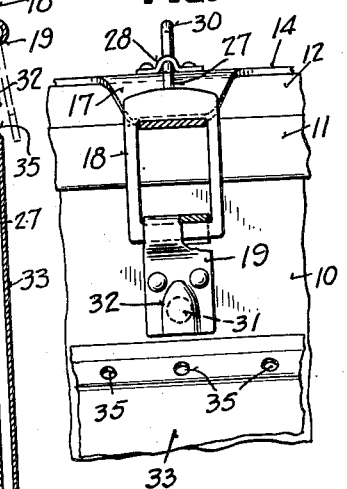
Fig. 3 is a fragmentary side elevational view.

The minnow pail selected for illustration comprises a substantially cylindrical sheet metal pail 10 normally closed by a flanged cover 11 fitted on the top thereof. The cover shown is formed with an elevated portion 12 having a large central opening 13 normally closed by a dished lid 14 having a peripheral supporting flange 15 removably seated on the elevated portion. The lid is preferably perforated, as indicated at 16.

Suitable provision is made for releasably locking the lid 14 and cover 11 to the body of the pail 10 so as to prevent loss of minnows therefrom when the pail is submerged. For this purpose the lid shown is equipped with a pair of ears 17 extending diametrically therefrom beyond the sides of the pail, the end of each ear being fashioned to receive and releasably retain the end of an appropriate retainer link 18. Each link 18 is hingedly supported at its lower end by a suitable bracket plate 19 riveted or otherwise fixed to the body of the pail. In order to insure against accidental release of the links 18 from the ears 17, each ear may be perforated, as at 20, or otherwise fashioned to receive a cotter pin 21 or other suitable retainer key. An effectively locked minnow container is thus provided which may be safely submerged without danger of minnow loss.

The pail shown is also equipped with an aerator constructed and arranged in a manner quite similar to that shown in my copending application herein above identified. In this instance the aerator shown comprises a disk 22 substantially coextensive with the cross-sectional area of the pail 10 and having an air trap in the form of an annular chamber 23 carried by the under side thereof. The chamber 23 is provided with a number of relatively large openings 24 in the bottom thereof for the free flow of air or water to and from the chamber and also with several bleed openings 25 in the top thereof providing for slow or restricted discharge of air therefrom. The central area 26 of the disk 22 is preferably perforated to permit free passage of water therethrough during elevation and depression thereof within the pail.

The disk 22 also functions as an elevator to lift the minnows to the top of the pail where they are readily accessible and easily withdrawn through the opening 13 in the cover 11.

Suitable means such as a bail 27 is provided for raising the disk 22 and for simultaneously raising the lid 14 so as to open the cover opening 13. The bail 27 is shown attached to the lid 14 by suitable straps 28 and loosely extended through the ears 17 and cover 11, the disk 22 being suitably fixed rigidly to the lower ends thereof, as indicated at 29. That portion of the bail 27 overlying the dished portion of the lid 14 is preferably offset upwardly and shaped to provide an appropriate handle 30 for the dual purpose of carrying the pail 10 and for lifting the lid 14 and disk 22 within the pail.

The arrangement is such that, when the links 18 are released from the ears 17, the bail 27 may be actuated to lift the lid 14 and disk 22 into the dotted line positions shown, so as to elevate the minnows to a position where they may be readily withdrawn through the then uncovered opening in the cover.

It will be noted that in the upper position just referred to the disk 22, with its air trap 23 is disposed above the water level in the pail, in which position the trap 23 immediately fills with air as the water drains therefrom. Thereafter, when the trap 23 is ultimately lowered into the normal full-line position shown, the air trapped therein escapes slowly through the bleed openings 25 and seeps upwardly through the water to effectively aerate the same.

In order to limit the water level in the pail so as to insure effective aeration in the manner described suitable overflow openings 31 are preferably provided in the sides of the pail. In this instance two such openings are shown, each being covered by one of the link-supporting bracket plates 19 which is channelled, as at 32, or otherwise fashioned to form a deflector by which the overflow of water is confined to the side of the pail.

The pail shown is equipped with an effective heat insulator in the form of an external encircling shell 33 spaced from the walls of the pail so as to form an air chamber 34 between the walls and shell. The shell is preferably coextensive in height with the body of water in the pail and suitable perforations 35 provided at the top and bottom of the shell insure free circulation of air through the insulating chamber thus formed. In this way the contents of the pail is well protected against the heat of the sun.

Various changes may be made in the embodiment of the invention hereinabove specifically described without departing from or sacrificing the advantages of the invention as defined in the appended claim.

I claim:

A minnow pail having a removable cover provided with an opening therein, a lid normally seated on said cover to close said opening, means for releasably locking said lid to said pail to retain said cover and lid in closed position thereon, minnow lifting means within said pail, and means projecting beyond the top of said pail for actuating said lifting means and said lid when said locking means is released, said projecting means being fashioned to function as a carrier for said pail when said locking means is locked.

MAXIMILLIAN P. JANISCH.

REFERENCES CITED

The following references are of record in the file of this patent:

UNITED STATES PATENTS

| Number | Name | Date |
| --- | --- | --- |
| 204,168 | Roney | May 28, 1878 |
| 321,606 | Hough | July 7, 1885 |
| 713,890 | Koch | Nov. 18, 1902 |
| 1,089,066 | Meyer | Mar. 3, 1914 |
| 1,127,522 | Rowe | Feb. 9, 1915 |
| 1,300,712 | Ferdon | Apr. 15, 1919 |
| 1,883,135 | Walker et al. | Oct. 18, 1932 |
| 1,897,571 | Camporini | Feb. 14, 1933 |